(12) United States Patent
Choi et al.

(10) Patent No.: US 11,012,424 B2
(45) Date of Patent: May 18, 2021

(54) SYSTEM AND METHOD FOR AUTHENTICATION

(71) Applicant: SAMSUNG SDS CO., LTD., Seoul (KR)

(72) Inventors: Kyu-Young Choi, Seoul (KR); Ji-Hoon Cho, Seoul (KR); Hyo-Jin Yoon, Seoul (KR); Duk-Jae Moon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 358 days.

(21) Appl. No.: 16/171,986

(22) Filed: Oct. 26, 2018

(65) Prior Publication Data

US 2019/0182221 A1 Jun. 13, 2019

(30) Foreign Application Priority Data

Oct. 31, 2017 (KR) .................. 10-2017-0143365

(51) Int. Cl.
*H04L 9/32* (2006.01)
*H04L 29/00* (2006.01)
*H04L 29/06* (2006.01)
*H04L 9/08* (2006.01)

(52) U.S. Cl.
CPC ........ *H04L 63/0428* (2013.01); *H04L 9/0866* (2013.01); *H04L 9/0894* (2013.01); *H04L 9/3231* (2013.01); *H04L 63/061* (2013.01)

(58) Field of Classification Search
None
See application file for complete search history.

(56) References Cited

U.S. PATENT DOCUMENTS 9,386,017 B2 * 7/2016 Sakemi ............... H04L 63/0861
2011/0314285 A1 * 12/2011 Hirata ..................... G06F 21/32
713/170
2013/0174243 A1 * 7/2013 Inatomi ............... H04L 63/0861
726/7

FOREIGN PATENT DOCUMENTS

JP 2001-325549 A 11/2001
KR 10-2016-0006836 A 1/2016

* cited by examiner

*Primary Examiner* — Fatoumata Traore
(74) *Attorney, Agent, or Firm* — Sughrue Mion, PLLC (57) ABSTRACT

An authentication system and method are provided. According to the embodiments of the present disclosure, it is possible to provide a secure authentication service capable of maintaining personal privacy by enabling authentication while preventing personal information used for personal authentication, such as biometric information, from being exposed in the authentication process.

24 Claims, 8 Drawing Sheets

SYSTEM AND METHOD FOR AUTHENTICATION

CROSS-REFERENCE TO RELATED APPLICATION(S)

This application claims the benefit under 35 USC § 119(a) of Korean Patent Application No. 10-2017-0143365, filed on Oct. 31, 2017, in the Korean Intellectual Property Office, the entire disclosure of which is incorporated herein by reference for all purposes.

BACKGROUND

1. Field

The following description relates to personal authentication technology.

2. Description of Related Art

With the development of biometric recognition technology, biometric information authentication technologies for using unique biometric information of an individual, such as iris, fingerprints, DNA, retina, veins, gait, face, voice, and the like, in personal authentication have been studied.

However, such biometric information cannot be changed voluntarily by each individual or is difficult to be changed, and thus when the biometric information leaks in the authentication process, it is directly related to a violation of privacy. Therefore, a technology for preventing leakage of biometric information in the authentication process is essential for authentication using the biometric information Recently, fast identity online (FIDO) technology has been developed and used as an authentication method that can prevent leakage of biometric information. However, since the FIDO technology is applicable only to a device possessed by an individual, such as a mobile terminal, it is difficult to apply the FIDO technology to a system requiring personal authentication for unspecified individuals, such as an airport immigration control system, a company's access control system, and a government office.

Accordingly, there is a need for a general-use biometric authentication technique that enables authentication without leakage of biometric information even in a system in which personal authentication is required for unspecified individuals, as well as in a device possessed by an individual.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an authentication system and method.

In one general aspect, there is provided an authentication system including a registration request apparatus, an authentication request apparatus, and an authentication server, wherein the registration request apparatus generates a master key, transmits the master key to the authentication request apparatus, generates an authentication key for registration target personal information using the registration target personal information and the master key, and transmits the authentication key to the authentication server, the authentication request apparatus stores the master key in a secure area of the authentication request apparatus, generates a ciphertext for authentication target personal information in the secure area by using the authentication target personal information and the master key, and transmits the generated ciphertext to the authentication server, and the authentication server receives the authentication key from the registration request apparatus, stores the authentication key, and performs authentication of the authentication target personal information using the authentication key and the ciphertext when the ciphertext is received from the authentication request apparatus.

The authentication server may perform the authentication by computing the authentication key and the ciphertext in an encrypted state.

The authentication server may calculate a similarity between the registration target personal information and the authentication target personal information by computing the authentication key and the ciphertext in an encrypted state, and perform the authentication based on the similarity.

The registration request apparatus may generate the master key and the authentication key using an initialization algorithm and an authentication key generation algorithm of functional encryption, the authentication request apparatus may generate the ciphertext using an encryption algorithm of the functional encryption, and the authentication server may calculate the similarity using a decryption algorithm of the functional encryption.

The registration request apparatus may delete the master key after generating the authentication key.

The registration request apparatus may generate the master key and the authentication key in a secure area of the registration request apparatus.

The registration target personal information and the authentication target personal information may be biometric information.

In another general aspect, there is provided an authentication method which is performed in an authentication system including a registration request apparatus, an authentication request apparatus, and an authentication server, the authentication method including generating, at the registration request apparatus, a master key, transmitting, at the registration request apparatus, the master key to the authentication request apparatus, receiving, at the authentication request apparatus, the master key and storing the master key in a secure area of the authentication request apparatus, generating, at the registration request apparatus, an authentication key for registration target personal information using the registration target personal information and the master key, transmitting, at the registration request apparatus, the authentication key to the authentication server, receiving and storing, at the authentication server, the authentication key, generating, at the authentication request apparatus, a ciphertext for authentication target personal information in the secure area by using the authentication target personal information and the master key, transmitting, at the authentication request apparatus, the ciphertext to the authentication server, and performing, at the authentication server, authentication of the authentication target personal information using the authentication key and the ciphertext.

The performing of the authentication may include performing the authentication by computing the authentication key and the ciphertext in an encrypted state.

The performing of the authentication may include calculating a similarity between the registration target personal information and the authentication target personal information by computing the authentication key and the ciphertext in an encrypted state, and performing the authentication based on the similarity.

The generating of the master key may include generating the master key using an initialization algorithm of functional encryption, the generating of the authentication key may include generating the authentication key using an encryption key generation algorithm of the functional encryption, the generating of the ciphertext may include generating the ciphertext using an encryption algorithm of the functional encryption, and the performing of the authentication may include calculating the similarity using a decryption algorithm of the functional encryption.

The authentication method may further include deleting, at the registration request apparatus, the master key after generating the authentication key.

In the generating of the master key and the generating of the authentication key, the master key and the authentication key may be generated in a secure area of the registration request apparatus.

The registration target personal information and the authentication target personal information may be biometric information.

In still another general aspect, there is provided an authentication system including a registration/authentication request apparatus and an authentication server, wherein the registration/authentication request apparatus generates a master key in a secure area of the registration/authentication request apparatus, stores the master key in the secure area, generates an authentication key for registration target personal information in the secure area by using the registration target personal information and the master key, transmits the authentication key to the authentication server, generates a ciphertext for authentication target personal information in the secure area by using the authentication target personal information and the master key, and transmits the ciphertext to the authentication server and the authentication server receives the authentication key from the registration/authentication request apparatus, stores the authentication key, and performs authentication of the authentication target personal information using the authentication key and the ciphertext when the ciphertext is received from the registration/authentication request apparatus.

The authentication server may perform the authentication by computing the authentication key and the ciphertext in an encrypted state.

The authentication server may calculate a similarity between the registration target personal information and the authentication target personal information by computing the authentication key and the ciphertext in an encrypted state and performs the authentication based on the similarity.

The registration/authentication request apparatus may generate the master key, the authentication key, and the ciphertext using an initialization algorithm, an authentication key generation algorithm, and an encryption algorithm of functional encryption and the authentication server may calculate the similarity using a decryption algorithm of the functional encryption.

The registration target personal information and the authentication target personal information may be biometric information.

In yet another general aspect, there is provided an authentication method which is performed in an authentication system including a registration/authentication request apparatus and an authentication server, the authentication method including generating, at the registration/authentication request apparatus, a master key in a secure area of the registration/authentication request apparatus, storing, at the registration/authentication request apparatus, the master key in the secure area, generating, at the registration/authentication request apparatus, an authentication key for registration target personal information in the secure area by using the registration target personal information and the master key, transmitting, at the registration/authentication request apparatus, the authentication key to the authentication server, receiving and storing, at the authentication server, the authentication key, generating, at the registration/authentication request apparatus, a ciphertext for authentication target personal information in the secure area by using the authentication target personal information and the master key, transmitting, at the registration/authentication request apparatus, the ciphertext to the authentication server, and performing, at the authentication server, authentication of the authentication target personal information using the authentication key and the ciphertext.

The performing of the authentication may include performing the authentication by computing the authentication key and the ciphertext in an encrypted state The performing of the authentication may include calculating a similarity between the registration target personal information and the authentication target personal information by computing the authentication key and the ciphertext in an encrypted state, and performing the authentication based on the similarity.

The generating of the master key may include generating the master key using an initialization algorithm of functional encryption, the generating of the authentication key may include generating the authentication key using an encryption key generation algorithm of the functional encryption, the generating of the ciphertext may include generating the ciphertext using an encryption algorithm of the functional encryption, and the performing of the authentication may include calculating the similarity using a decryption algorithm of the functional encryption.

The registration target personal information and the authentication target personal information may be biometric information.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
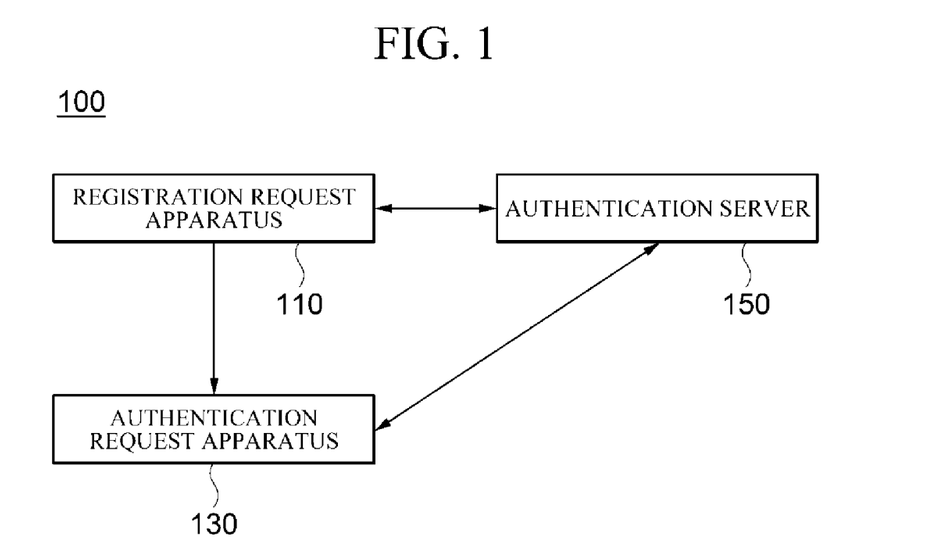
FIG. 1 is a diagram illustrating a configuration of an authentication system according to one embodiment of the present disclosure.

FIG. 1 is a diagram illustrating a configuration of an authentication system according to one embodiment of the present disclosure.

Referring to FIG. 1, the authentication system 100 includes a registration request apparatus 110, an authentication request apparatus 130, and an authentication server 150.

The registration request apparatus 110 is an apparatus which receives registration target personal information X and registers an authentication key $sk_x$ for the registration target personal information in the authentication server 150.

In this case, the registration target personal information X may be, for example, biometric information, such as iris, fingerprints, DNA, retina, veins, gait, face, voice, and the like, and may further include various forms of information that can be used in verifying the identify of each individual. In addition, the registration request apparatus 110 may include various forms of input means, such as a sensor, a camera, and the like, in order to receive the registration target personal information X.

The registration request apparatus 110 may generate a master key msk and transmit the master key msk to the authentication request apparatus 130, and when the registration target personal information is input, the registration request apparatus 110 may generate the authentication key $sk_x$ using the registration target personal information X and the master key msk. Then, the registration request apparatus 110 may transmit the generated authentication key $sk_x$ to the authentication server 130 to register the authentication key $sk_x$ in the authentication server 130.

Meanwhile, the master key msk and the authentication key $sk_x$ may be generated in, for example, a secure area of the registration request apparatus 100, such as a secure element (SE), a trusted execution environment (TEE), or the like.

In addition, the registration request apparatus 130 my delete the master key msk after the authentication key $sk_x$ is generated.

The authentication request apparatus 130 is an apparatus which receives authentication target personal information Y and requests the authentication server 130 to perform authentication of the authentication target personal information Y.

In this case, the authentication target personal information Y may have the same form as the registration target personal information X. In addition, the authentication request apparatus 130 may include various forms of input means, such as a sensor, a camera, and the like, for receiving the authentication target personal information Y.

The authentication request apparatus 130 receives the master key msk from the registration request apparatus 110 and stores the received master key msk. Here, the master key msk may be stored in a secure area of the authentication request apparatus 130, such as an SE, a TEE, or the like.

In addition, when the authentication target personal information Y is input, the authentication request apparatus 130 may generate a ciphertext for the authentication target personal information Y using the stored master key msk and authentication target personal information Y and transmit the generated ciphertext to the authentication server 150 to request the authentication of the authentication target personal information Y. In this case, the ciphertext C for the authentication target personal information Y may be generated in the secure area of the authentication request apparatus 130.

The authentication server 150 is a server for authentication of the authentication target personal information Y using the authentication key $sk_x$ received from the registration request apparatus 110 and the ciphertext C received from the authentication request apparatus 130.

Specifically, the authentication server 150 may store the authentication key $sk_x$ received from the registration request apparatus 110. Then, when the authentication server 150 receives the ciphertext C for the authentication target personal information Y from the authentication request apparatus 130, the authentication server 150 may perform authentication of authentication target personal information Y using the stored authentication key $sk_x$ and the received ciphertext C and transmit the authentication result to the authentication request apparatus 130.

In this case, the authentication server 150 may determine whether or not the registration target personal information X used to generate the authentication key $sk_x$ matches the authentication target personal information Y used to generate the ciphertext C by computing the stored authentication key $sk_x$ and the received ciphertext C in an encrypted state.

Specifically, according to one embodiment of the present disclosure, the generation of the master key msk and the generation of the authentication key $sk_x$ in the registration request apparatus 110, the generation of the ciphertext C in the authentication request apparatus 130, and the authentication performed in the authentication server 150 may be performed using a symmetric key-based functional encryption technique.

Specifically, the symmetric key-based functional encryption is performed through the following algorithms.

Setup(k)→msk: an initialization algorithm for generating a master key msk from a secure parameter k KeyGen(msk, X)→$sk_x$: a key generation algorithm for generating an authentication key $sk_x$ by encrypting a master key msk and data X Enc(msk, Y)→C: an encryption algorithm for generating a ciphertext C by encrypting a master key msk and data Y Dec($sk_x$, C)→F(X, Y): a decryption algorithm for generating a result value equal to F(X, Y) by computing an authentication key $sk_x$ and a ciphertext C in an encrypted state Here, the computation of the authentication key $sk_x$ and ciphertext C in an encrypted state means that the authentication key $sk_x$ and the ciphertext C are not decrypted into data X and data Y, respectively, during the computation.

In addition, F(X, Y) may be various types of functions for calculating the similarity between data X and data Y, for example, an inner-product function.

Meanwhile, each algorithm of the above-described symmetric key-based functional encryption may use various types of algorithms designed in symmetric key-based functional encryption which is already well-known or will be developed in the future.

The registration request apparatus 110 may generate the master key msk using the above-described initialization algorithm Setup(k) of the symmetric key-based functional encryption, and generate the authentication key $sk_x$ using the authentication key generation algorithm KeyGen(msk, X) when the registration target personal information X is input.

In addition, when the authentication target personal information Y is input, the authentication request apparatus 130 may generate the ciphertext C using the encryption algorithm Enc(msk, Y).

Moreover, the authentication server 150 may receive the master key msk from the registration request apparatus 110 and stores the received master key msk. When the ciphertext C is received from the authentication request apparatus 130, the authentication server 150 may calculate a similarity between the registration target personal information X and the authentication target personal information Y using the decryption algorithm Dec($sk_x$, C). For example, assuming that F(X, Y) is an inner-product function which produces a result value of 1 when X matches Y, the authentication server 150 may determine that the authentication for the authentication personal information Y is successful when the result value of F(X, Y) produced using the decryption algorithm Dec($Sk_x$, C) is 1 or falls within a preset error range.

Figure 2:
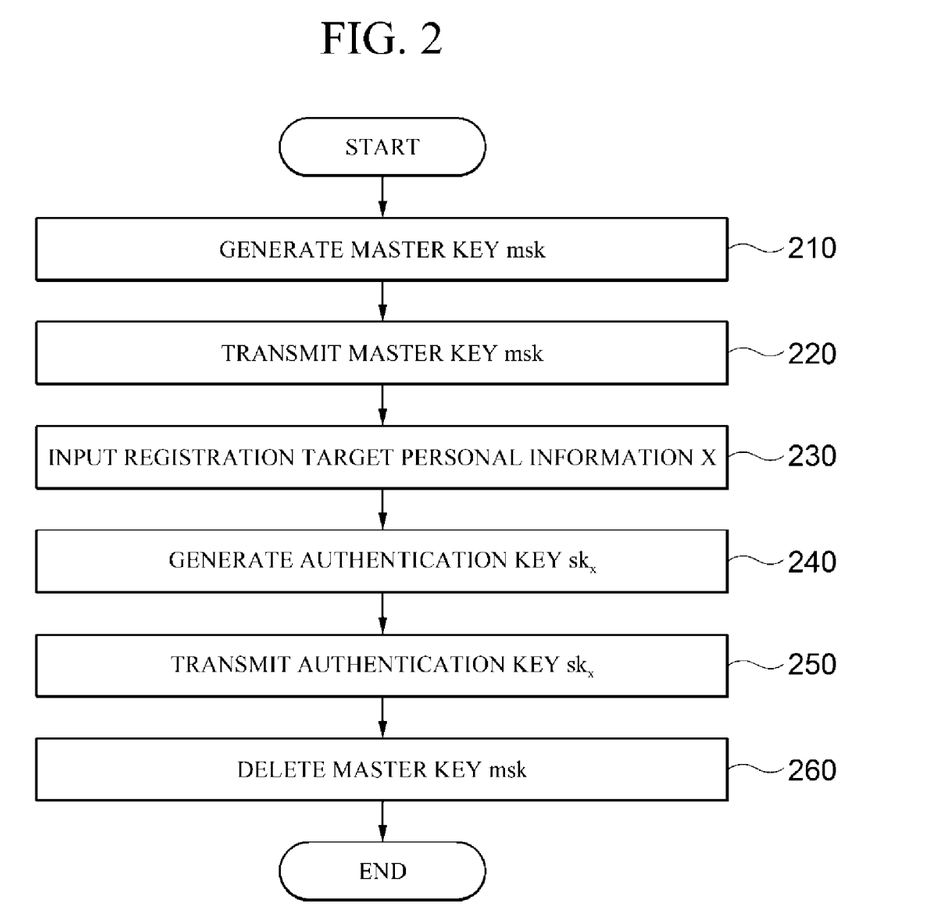
FIG. 2 is a flowchart illustrating a process of registering an authentication key for registration target personal information according to one embodiment of the present disclosure.

FIG. 2 is a flowchart illustrating a process of registering an authentication key for registration target personal information according to one embodiment of the present disclosure.

The process illustrated in FIG. 2 may be performed by the registration request apparatus 110 shown in FIG. 1.

Referring to FIG. 2, the registration request apparatus 110 generates a master key msk in operation 210. In this case, the master key msk may be generated using an initialization algorithm (i.e., Setup(k)) of symmetric key-based functional encryption.

Then, the registration request apparatus 110 transmits the generated master key msk to an authentication request apparatus 130 in operation 220.

Then, the registration request apparatus 110 receives registration target personal information X in operation 230. Here, the registration target personal information may be biometric information.

Then, the registration request apparatus 110 generates an authentication key $sk_x$ using the registration target personal information X and the master key msk in operation 240. In this case, the authentication key $sk_x$ may be generated using an authentication key generation algorithm (i.e., KeyGen (msk, X)) of the symmetric key-based functional encryption.

Thereafter, the registration request apparatus 110 transmits the generated authentication key $sk_x$ to an authentication server 150 to request registration of the authentication $sk_x$ in operation 250.

Then, the registration request apparatus 110 deletes the generated master key msk in operation 260.

Meanwhile, in the process shown in FIG. 2, operations 210 and 240 may be performed in a secure area of the registration request apparatus 110 and the master key msk generated in operation 210 may remain stored in the secure area until deleted.

Figure 3:
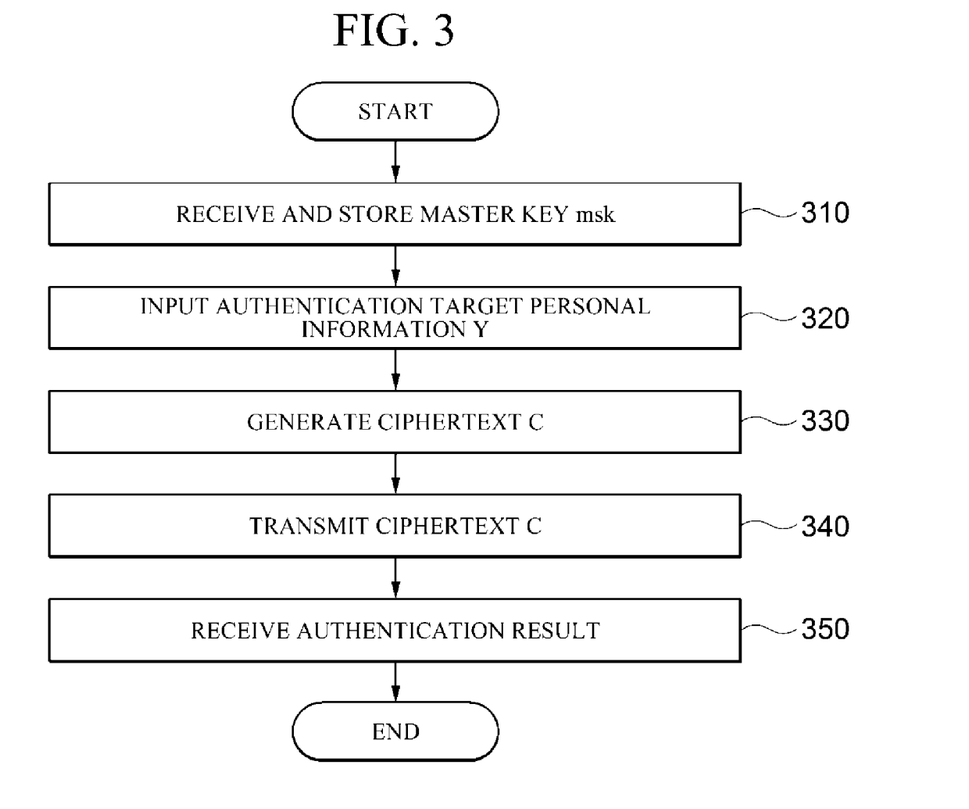
FIG. 3 is a flowchart illustrating a process of requesting authentication of authentication target personal information according to one embodiment of the present disclosure.

FIG. 3 is a flowchart illustrating a process of requesting authentication of authentication target personal information according to one embodiment of the present disclosure.

The process shown in FIG. 3 may be performed by the authentication request apparatus 130 shown in FIG. 1.

Referring to FIG. 3, in operation 310, the authentication request apparatus 130 receives a master key msk from a registration request apparatus 110 and stores the received master key msk. In this case, the received master key msk may be stored in a secure area of the authentication request apparatus 130.

Then, the authentication request apparatus 130 receives authentication target personal information Y in operation 320. Here, the authentication target personal information may be biometric information.

Then, the authentication request message 130 generates a ciphertext C for the authentication target personal information Y using the authentication target personal information Y and the master key msk in operation 330. In this case, the ciphertext C may be generated using an encryption algorithm (i.e., Enc(msk, Y)) of symmetric key-based functional encryption. Also, the generation of the ciphertext C may be performed in the secure area of the authentication request apparatus 130.

Then, the authentication request apparatus 130 transmits the generated ciphertext C to an authentication server 150 to request authentication of the authentication target personal information Y in operation 340.

Thereafter, the authentication request apparatus 130 receives an authentication result from the authentication server 150 in operation 350.

Figure 4:
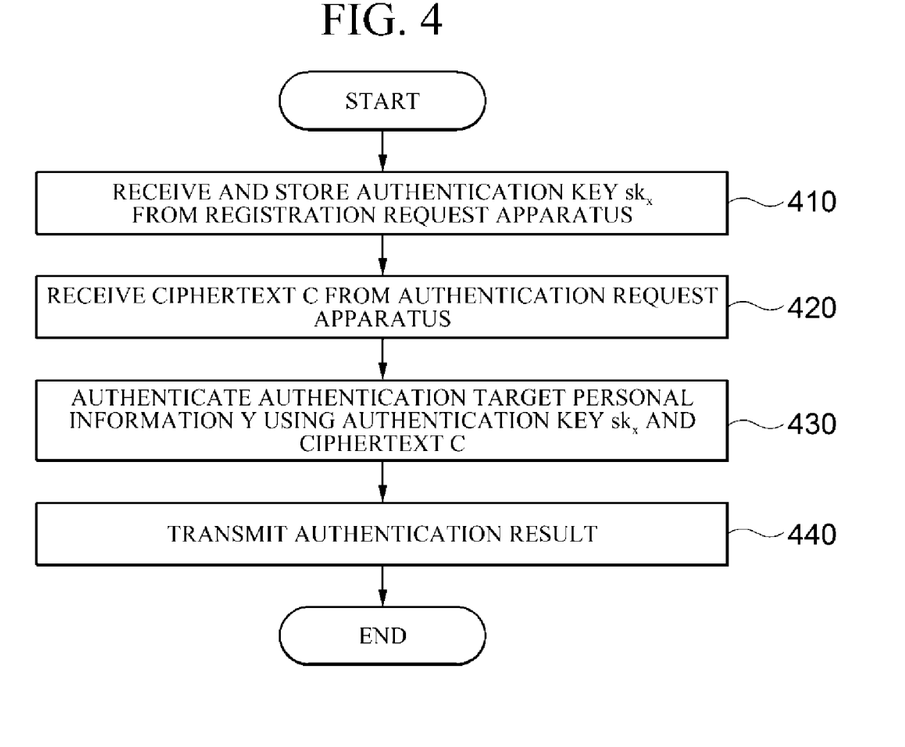
FIG. 4 is a flowchart illustrating an authentication process according to one embodiment of the present disclosure.

FIG. 4 is a flowchart illustrating an authentication process according to one embodiment of the present disclosure.

The process shown in FIG. 4 may be performed by the authentication server 150 shown in FIG. 1.

Referring to FIG. 4, the authentication server 150 receives an authentication key $sk_x$ for registration target personal information X from a registration request apparatus 110 and stores the authentication key $sk_x$ in operation 410.

Then, the authentication server 150 receives a ciphertext C for authentication target personal information Y from an authentication request apparatus 130 in operation 420.

Then, the authentication server 150 performs authentication of the authentication target personal information Y by computing the authentication key $sk_x$ and the ciphertext C in an encrypted state in operation 430.

In this case, the authentication server 150 may calculate a similarity between the registration target personal information X and the authentication target personal information Y by computing the authentication key $sk_x$ and the ciphertext C in an encrypted state and perform authentication on the basis of the calculated similarity. In addition, the similarity may be calculated using a decryption algorithm (i.e., Dec ($sk_x$, C)) of symmetric key-based functional encryption.

Thereafter, the authentication server 150 transmits an authentication result for the authentication target personal information Y to the authentication request apparatus 130 in operation 440.

Meanwhile, in the flowcharts illustrated in FIGS. 2 to 4, each process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 5:
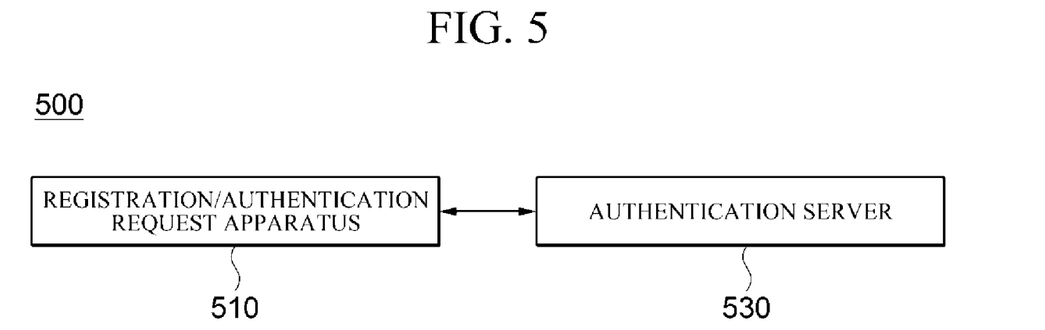
FIG. 5 is a diagram illustrating a configuration of an authentication system according to another embodiment of the present disclosure.

FIG. 5 is a diagram illustrating a configuration of an authentication system according to another embodiment of the present disclosure.

Referring to FIG. 5, the authentication system 500 according to another embodiment of the present disclosure includes a registration/authentication request apparatus 510 and an authentication server 530.

Unlike the authentication system 100 shown in FIG. 1 in which the registration request apparatus 110 and the authentication request apparatus 130 are separately implemented, the registration request apparatus and the authentication request apparatus are implemented as a single apparatus, i.e., the registration/authentication request apparatus 510 in the authentication system 500 shown in FIG. 5.

Specifically, the registration/authentication request apparatus 510 may generate a master key msk. In this case, the master key msk may be generated using an initialization algorithm (i.e., Setup(k)) of symmetric key-based functional encryption.

When registration target personal information X is input, the registration/authentication request apparatus 510 may generate an authentication key $sk_x$ for the registration target personal information X using the master key msk and the registration target personal information X and transmit the generated authentication key $sk_x$ to the authentication server 530 to request registration of the authentication key $sk_x$. In this case, the authentication key $sk_x$ may be generated using an authentication key generation algorithm (i.e., KeyGen (msk, X)) of the symmetric key-based functional encryption.

Meanwhile, when authentication target personal information Y is input, the registration/authentication request apparatus 510 may generate a ciphertext C for the authentication target personal information Y using the master key msk and the authentication target personal information Y. In this case, the ciphertext C may be generated using an encryption algorithm (i.e., Enc(msk, Y)) of the symmetric key-based functional encryption.

Meanwhile, when the ciphertext C is generated, the registration/authentication request apparatus 510 may transmit the generated ciphertext C to the authentication server 530 to request authentication.

The generation of the master key msk, the authentication key $sk_x$, and the ciphertext C may be performed in a secure area of the registration/authentication request apparatus 510, and the generated master key msk may be stored and managed in the secure area.

Meanwhile, the configuration of the authentication server 530 is the same as that of the authentication server 170 shown in FIG. 1 except that the authentication key $sk_x$ and the ciphertext C are received from the same apparatus (i.e., the registration/authentication request apparatus 510), and hence detailed description thereof will not be reiterated.

Figure 6:
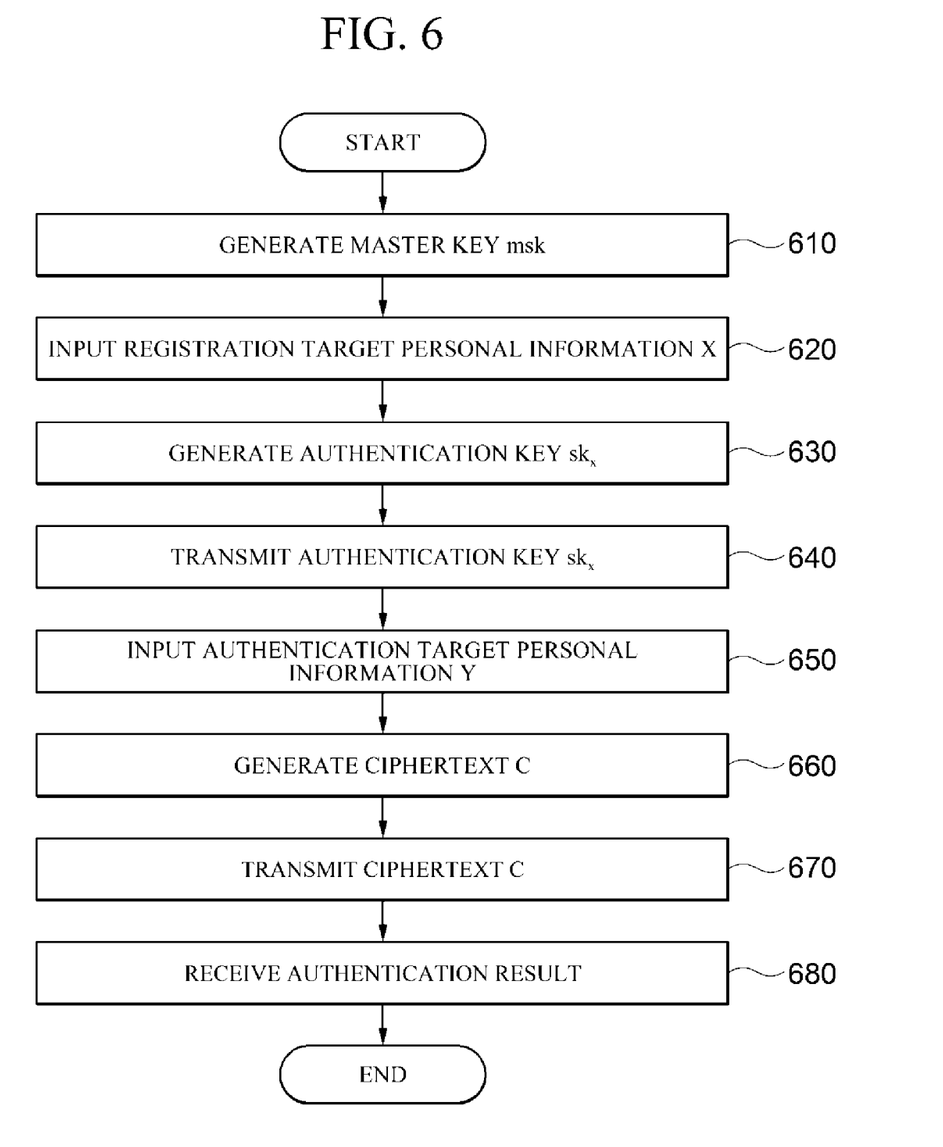
FIG. 6 is a flowchart illustrating a process of registering registration target personal information and requesting authentication of authentication target personal information according to one embodiment of the present disclosure.

FIG. 6 is a flowchart illustrating a process of registering registration target personal information and requesting authentication of authentication target personal information according to one embodiment of the present disclosure.

The process shown in FIG. 6 may be performed by the registration/authentication request apparatus 510 shown in FIG. 5.

Referring to FIG. 6, the registration/authentication request apparatus 510 generates a master key msk in operation 610. In this case, the master key msk may be generated using an initialization algorithm (i.e., Setup(k)) of symmetric key-based functional encryption.

Then, the registration/authentication request apparatus 510 receives registration target personal information X in operation 620. In this case, the registration target personal information may be biometric information.

Then, the registration/authentication request apparatus 510 generates an authentication key $sk_x$ using the registration target personal information X and the master key msk in operation 630. In this case, the authentication key $sk_x$ may be generated using an authentication key generation algorithm (i.e., KeyGen(msk, X)) of the symmetric key-based functional encryption.

Then, the registration/authentication request apparatus 510 transmits the generated authentication key $sk_x$ to the authentication server 530 to request registration of the authentication key $sk_x$ in operation 640.

Then, the registration/authentication request apparatus 510 receives authentication target personal information Y in operation 650. Here, the authentication target personal information Y may be biometric information.

Then, the registration/authentication request apparatus 510 generates a ciphertext C for the authentication target personal information Y using the authentication target personal information Y and the master key msk in operation 660. In this case, the ciphertext C may be generated using an encryption algorithm (i.e., Enc(msk, Y)) of the symmetric key-based functional encryption.

Then, the registration/authentication request apparatus 510 transmits the generated ciphertext C to the authentication server 530 to request authentication in operation 670.

Then, the registration/authentication request apparatus 510 receives an authentication result from the authentication server 530 in operation 680.

Meanwhile, in the process illustrated in FIG. 6, operations 610, 630, and 660 may be performed in a secure area of the registration/authentication request apparatus 510, and the master key msk may be stored in the secure area.

Figure 7:
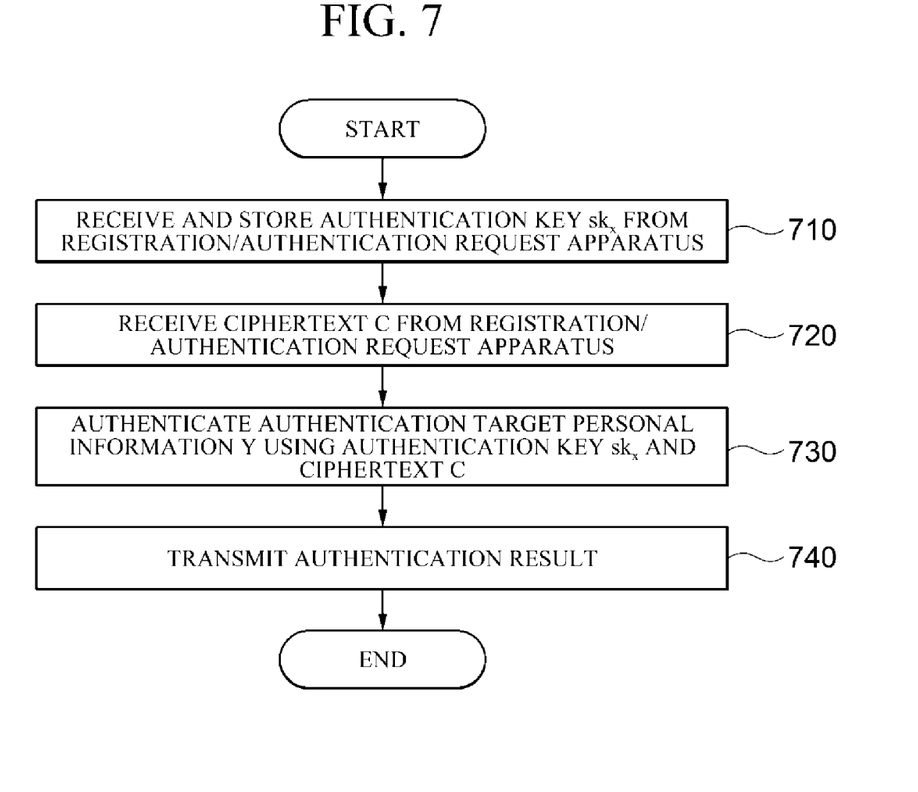
FIG. 7 is a flowchart illustrating an authentication process according to another embodiment of the present disclosure.

FIG. 7 is a flowchart illustrating an authentication process according to another embodiment of the present disclosure.

The process shown in FIG. 7 may be performed by the authentication server 530 shown in FIG. 5.

Referring to FIG. 7, the authentication server 530 receives an authentication key $sk_x$ for registration target personal information X from a registration/authentication request apparatus 510 and stores the received authentication key $sk_x$ in operation 710.

Then, the authentication server 530 receives a ciphertext C for authentication target personal information Y from the registration/authentication request apparatus 510 in operation 720.

Then, the authentication server 530 performs authentication of the authentication target personal information Y by computing the authentication key $sk_x$ and the ciphertext C in an encrypted state in operation 730.

In this case, the authentication server 530 may calculate a similarity between the registration target personal information X and the authentication target personal information Y by computing the authentication key $sk_x$ and the ciphertext C in an encrypted state and perform authentication on the basis of the calculated similarity. In addition, the similarity may be calculated using a decryption algorithm (i.e., Dec ($sk_x$, C)) of symmetric key-based functional encryption.

Then, the authentication server 530 transmits an authentication result for the authentication target personal information Y to the registration/authentication request apparatus 510 in operation 740.

Meanwhile, in the flowcharts illustrated in FIGS. 6 and 7, each process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 8:
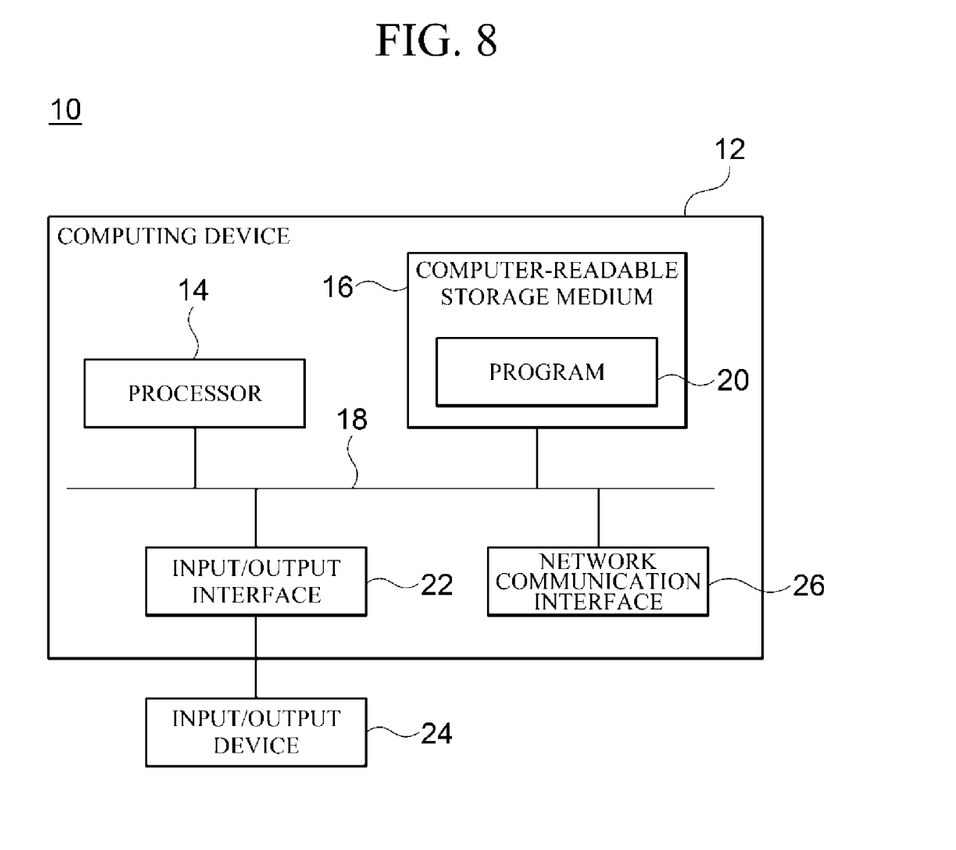
FIG. 8 is a block diagram illustrating an example of a computing environment including a computing device suitable to be used in exemplary embodiments of the present disclosure.

FIG. 8 is a block diagram illustrating an example of a computing environment including a computing device suitable to be used in exemplary embodiments of the present disclosure. In the illustrated embodiment, each of the components may have functions and capabilities different from those described hereinafter and additional components may be included in addition to the components described herein.

The illustrated computing environment 10 includes a computing device. In one embodiment, the computing device 12 may be one or more components included in each of, for example, the registration request apparatus 110, the authentication request apparatus 130, the authentication servers 150 and 530, and the registration/authentication request apparatus 510.

The computing device 12 may include at least one processor 14, a computer-readable storage medium 16, and a communication bus 18. The processor 14 may cause the computing device 12 to operate according to the aforementioned exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer-readable storage medium 16 is configured to store computer executable commands and program codes, program data and/or information in other suitable forms. The programs stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the embodiments of the present disclosure, it is possible to provide a secure authentication service capable of maintaining personal privacy by enabling authentication while preventing personal information used for personal authentication, such as biometric information, from being exposed in the authentication process.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An authentication system comprising:
a registration request apparatus;
an authentication request apparatus; and
an authentication server,
wherein the registration request apparatus generates a master key, transmits the master key to the authentication request apparatus, generates an authentication key for registration target personal information using the registration target personal information and the master key, and transmits the authentication key to the authentication server,
the authentication request apparatus stores the master key in a secure area of the authentication request apparatus, generates a ciphertext for authentication target personal information in the secure area by using the authentication target personal information and the master key, and transmits the generated ciphertext to the authentication server, and
the authentication server receives the authentication key from the registration request apparatus, stores the authentication key, and performs authentication of the authentication target personal information using the authentication key and the ciphertext when the ciphertext is received from the authentication request apparatus.

2. The authentication system of claim 1, wherein the authentication server performs the authentication by computing the authentication key and the ciphertext in an encrypted state.

3. The authentication system of claim 2, wherein the authentication server calculates a similarity between the registration target personal information and the authentication target personal information by computing the authentication key and the ciphertext in an encrypted state, and performs the authentication based on the similarity.

4. The authentication system of claim 3, wherein the registration request apparatus generates the master key and the authentication key using an initialization algorithm and an authentication key generation algorithm of functional encryption, the authentication request apparatus generates the ciphertext using an encryption algorithm of the functional encryption, and the authentication server calculates the similarity using a decryption algorithm of the functional encryption.

5. The authentication system of claim 1, wherein the registration request apparatus deletes the master key after generating the authentication key.

6. The authentication system of claim 1, wherein the registration request apparatus generates the master key and the authentication key in a secure area of the registration request apparatus.

7. The authentication system of claim 1, wherein the registration target personal information and the authentication target personal information are biometric information.

8. An authentication method which is performed in an authentication system including a registration request apparatus, an authentication request apparatus, and an authentication server, the authentication method comprising:

generating, at the registration request apparatus, a master key;

transmitting, at the registration request apparatus, the master key to the authentication request apparatus;

receiving, at the authentication request apparatus, the master key and storing the master key in a secure area of the authentication request apparatus;

generating, at the registration request apparatus, an authentication key for registration target personal information using the registration target personal information and the master key;

transmitting, at the registration request apparatus, the authentication key to the authentication server;

receiving and storing, at the authentication server, the authentication key;

generating, at the authentication request apparatus, a ciphertext for authentication target personal information in the secure area by using the authentication target personal information and the master key;

transmitting, at the authentication request apparatus, the ciphertext to the authentication server; and performing, at the authentication server, authentication of the authentication target personal information using the authentication key and the ciphertext.

9. The authentication method of claim 8, wherein the performing of the authentication comprises performing the authentication by computing the authentication key and the ciphertext in an encrypted state.

10. The authentication method of claim 9, wherein the performing of the authentication comprises:

calculating a similarity between the registration target personal information and the authentication target personal information by computing the authentication key and the ciphertext in an encrypted state; and performing the authentication based on the similarity.

11. The authentication method of claim 10, wherein the generating of the master key comprises generating the master key using an initialization algorithm of functional encryption, the generating of the authentication key comprises generating the authentication key using an encryption key generation algorithm of the functional encryption, the generating of the ciphertext comprises generating the ciphertext using an encryption algorithm of the functional encryption, and the performing of the authentication comprises calculating the similarity using a decryption algorithm of the functional encryption.

12. The authentication method of claim 8, further comprising deleting, at the registration request apparatus, the master key after generating the authentication key.

13. The authentication method of claim 8, wherein in the generating of the master key and the generating of the authentication key, the master key and the authentication key are generated in a secure area of the registration request apparatus.

14. The authentication method of claim 8, wherein the registration target personal information and the authentication target personal information are biometric information.

15. An authentication system comprising:

a registration/authentication request apparatus; and an authentication server, wherein the registration/authentication request apparatus generates a master key in a secure area of the registration/authentication request apparatus, stores the master key in the secure area, generates an authentication key for registration target personal information in the secure area by using the registration target personal information and the master key, transmits the authentication key to the authentication server, generates a ciphertext for authentication target personal information in the secure area by using the authentication target personal information and the master key, and transmits the ciphertext to the authentication server, and the authentication server receives the authentication key from the registration/authentication request apparatus, stores the authentication key, and performs authentication of the authentication target personal information using the authentication key and the ciphertext when the ciphertext is received from the registration/authentication request apparatus.

16. The authentication system of claim 15, wherein the authentication server performs the authentication by computing the authentication key and the ciphertext in an encrypted state.

17. The authentication system of claim 16, wherein the authentication server calculates a similarity between the registration target personal information and the authentication target personal information by computing the authentication key and the ciphertext in an encrypted state and performs the authentication based on the similarity.

18. The authentication system of claim 17, wherein the registration/authentication request apparatus generates the master key, the authentication key, and the ciphertext using an initialization algorithm, an authentication key generation algorithm, and an encryption algorithm of functional encryption and the authentication server calculates the similarity using a decryption algorithm of the functional encryption.

19. The authentication system of claim 15, wherein the registration target personal information and the authentication target personal information are biometric information.

20. An authentication method which is performed in an authentication system including a registration/authentication request apparatus and an authentication server, the authentication method comprising:

generating, at the registration/authentication request apparatus, a master key in a secure area of the registration/authentication request apparatus;

storing, at the registration/authentication request apparatus, the master key in the secure area;

generating, at the registration/authentication request apparatus, an authentication key for registration target personal information in the secure area by using the registration target personal information and the master key;

transmitting, at the registration/authentication request apparatus, the authentication key to the authentication server;

receiving and storing, at the authentication server, the authentication key;

generating, at the registration/authentication request apparatus, a ciphertext for authentication target personal information in the secure area by using the authentication target personal information and the master key;

transmitting, at the registration/authentication request apparatus, the ciphertext to the authentication server; and performing, at the authentication server, authentication of the authentication target personal information using the authentication key and the ciphertext.

21. The authentication method of claim 20, wherein the performing of the authentication comprises performing the authentication by computing the authentication key and the ciphertext in an encrypted state.

22. The authentication method of claim 21, wherein the performing of the authentication comprises calculating a similarity between the registration target personal information and the authentication target personal information by computing the authentication key and the ciphertext in an encrypted state, and performing the authentication based on the similarity.

23. The authentication method of claim 22, wherein the generating of the master key comprises generating the master key using an initialization algorithm of functional encryption, the generating of the authentication key comprises generating the authentication key using an encryption key generation algorithm of the functional encryption, the generating of the ciphertext comprises generating the ciphertext using an encryption algorithm of the functional encryption, and the performing of the authentication comprises calculating the similarity using a decryption algorithm of the functional encryption.

24. The authentication method of claim 20, wherein the registration target personal information and the authentication target personal information are biometric information.

* * * * *